United States Patent
Metz et al.

(10) Patent No.: US 11,904,906 B2
(45) Date of Patent: Feb. 20, 2024

(54) SYSTEMS AND METHODS FOR PREDICTION OF A JAYWALKER TRAJECTORY THROUGH AN INTERSECTION

(71) Applicant: Argo AI, LLC, Pittsburgh, PA (US)

(72) Inventors: Alexander Metz, Bavaria (DE); Friederike Schneemann, Munich (DE)

(73) Assignee: Argo AI, LLC, Pittsburgh, PA (US)

( * ) Notice: Subject to any disclaimer, the term of this patent is extended or adjusted under 35 U.S.C. 154(b) by 158 days.

(21) Appl. No.: 17/394,853

(22) Filed: Aug. 5, 2021

(65) Prior Publication Data
US 2023/0043474 A1    Feb. 9, 2023

(51) Int. Cl.
*B60W 60/00*    (2020.01)

(52) U.S. Cl.
CPC ... *B60W 60/00274* (2020.02); *B60W 2552/45* (2020.02); *B60W 2554/4026* (2020.02); *B60W 2554/4029* (2020.02); *B60W 2554/4041* (2020.02); *B60W 2554/4044* (2020.02); *B60W 2554/4045* (2020.02)

(58) Field of Classification Search
CPC ... B60W 60/00274; B60W 2554/4041; B60W 2554/4026; B60W 2554/4029; B60W 2554/4044; B60W 2554/4045; B60W 2552/45
USPC ............................................................ 701/25
See application file for complete search history.

(56) References Cited

U.S. PATENT DOCUMENTS

| | | | |
|---|---|---|---|
| 5,867,804 A | 2/1999 | Pilley et al. | |
| 8,954,252 B1* | 2/2015 | Urmson | G08G 1/167 701/301 |
| 9,097,553 B2* | 8/2015 | Kurtti | G01C 21/3679 |
| 9,196,164 B1 | 11/2015 | Urmson et al. | |
| 9,786,177 B2 | 10/2017 | Ayvaci et al. | |
| 10,093,289 B2* | 10/2018 | Lee | B60T 7/22 |

(Continued)

FOREIGN PATENT DOCUMENTS

| | | |
|---|---|---|
| CN | 112572462 B | 9/2022 |
| JP | 6760898 B2 | 9/2020 |

(Continued)

OTHER PUBLICATIONS

Chang et al. "Argoverse: 3D tracking and Forecasting with Rich Maps", published Nov. 6, 2019 available at <https://arxiv.org/abs/1911.02620>.

(Continued)

*Primary Examiner* — Richard A Goldman
(74) *Attorney, Agent, or Firm* — Fox Rothschild LLP

(57) ABSTRACT

Methods and systems for controlling navigation of a vehicle are disclosed. The system will first detect a URU within a threshold distance of a drivable area that a vehicle is traversing or will traverse. The system will then receive perception information relating to the URU, and use a plurality of features associated with each of a plurality of entry points on a drivable area boundary that the URU can use to enter the drivable area to determine a likelihood that the URU will enter the drivable area from that entry point. The system will then generate a trajectory of the URU using the plurality of entry points and the corresponding likelihoods, and control navigation of the vehicle while traversing the drivable area to avoid collision with the URU.

12 Claims, 7 Drawing Sheets

(56) References Cited

U.S. PATENT DOCUMENTS

| | | | |
|---|---|---|---|
| 10,112,528 B1* | 10/2018 | Mazuir | B60Q 1/44 |
| 10,235,882 B1 | 3/2019 | Aoude et al. | |
| 10,866,305 B1* | 12/2020 | Campbell | G01S 7/2923 |
| 11,433,922 B1* | 9/2022 | Van Heukelom | G05D 1/0221 |
| 2007/0263901 A1* | 11/2007 | Wu | G06V 20/584 |
| | | | 382/104 |
| 2012/0029730 A1* | 2/2012 | Nagura | G08G 1/096725 |
| | | | 701/2 |
| 2013/0013184 A1* | 1/2013 | Morotomi | G08G 1/163 |
| | | | 701/301 |
| 2014/0074359 A1* | 3/2014 | Lane | H04N 7/18 |
| | | | 348/148 |
| 2015/0166062 A1* | 6/2015 | Johnson | G08G 1/167 |
| | | | 701/41 |
| 2016/0176399 A1* | 6/2016 | Takagi | B60W 30/18154 |
| | | | 701/301 |
| 2016/0300485 A1 | 10/2016 | Ayvaci et al. | |
| 2017/0232964 A1* | 8/2017 | Moritani | B60W 30/09 |
| | | | 701/70 |
| 2017/0259753 A1* | 9/2017 | Meyhofer | B60R 11/04 |
| 2017/0329332 A1* | 11/2017 | Pilarski | B60W 30/095 |
| 2017/0355553 A1* | 12/2017 | Steinhauer | B66B 5/02 |
| 2018/0096605 A1* | 4/2018 | Bai | G08G 1/166 |
| 2018/0186407 A1* | 7/2018 | Kim | B60W 10/18 |
| 2018/0326982 A1* | 11/2018 | Paris | B60W 30/18154 |
| 2019/0011925 A1* | 1/2019 | Bansal | G08G 1/096708 |
| 2019/0093619 A1* | 3/2019 | Vadlamani | F02N 11/006 |
| 2019/0122037 A1 | 4/2019 | Russell et al. | |
| 2019/0146519 A1* | 5/2019 | Miura | G06V 40/103 |
| | | | 701/28 |
| 2019/0213886 A1* | 7/2019 | Noda | G08G 1/16 |
| 2019/0278270 A1* | 9/2019 | Tsuchiya | B60W 60/0011 |
| 2019/0355245 A1* | 11/2019 | Gigengack | G08G 1/0112 |
| 2020/0005649 A1* | 1/2020 | Kim | G08G 1/143 |
| 2020/0008086 A1* | 1/2020 | Lu | H04J 11/0066 |
| 2020/0026277 A1 | 1/2020 | Palanisamy et al. | |
| 2020/0160714 A1* | 5/2020 | Inaba | G08G 1/166 |
| 2020/0164799 A1* | 5/2020 | Nowakowski | B60R 1/00 |
| 2020/0173800 A1* | 6/2020 | Dudar | G06Q 50/30 |
| 2020/0207375 A1* | 7/2020 | Mehta | G06V 20/56 |
| 2020/0247434 A1* | 8/2020 | Kim | B60W 60/0017 |
| 2020/0279487 A1* | 9/2020 | Toda | B60W 60/0015 |
| 2020/0331465 A1* | 10/2020 | Herman | G08G 1/161 |
| 2021/0065551 A1* | 3/2021 | Manohar | G08G 1/0129 |
| 2021/0188261 A1* | 6/2021 | Song | B60W 50/14 |
| 2021/0241613 A1* | 8/2021 | Yi | G08G 1/096783 |
| 2021/0261159 A1* | 8/2021 | Pazhayampallil | G06V 10/25 |
| 2021/0304615 A1* | 9/2021 | Ishii | G06Q 50/30 |
| 2021/0312199 A1* | 10/2021 | Hashimoto | G05D 1/0246 |
| 2021/0312795 A1* | 10/2021 | Schonfeld | G08G 1/0129 |
| 2021/0347294 A1* | 11/2021 | Mochizuki | F21S 41/675 |
| 2021/0347383 A1* | 11/2021 | Siebert | G01C 21/3407 |
| 2021/0382489 A1* | 12/2021 | Goyal | G05D 1/0214 |
| 2021/0383686 A1* | 12/2021 | Xu | G08G 1/04 |
| 2021/0383695 A1* | 12/2021 | Kose Cihangir | G08G 1/163 |
| 2022/0089152 A1* | 3/2022 | Oh | B60W 60/0015 |
| 2022/0144169 A1* | 5/2022 | Sperrle | G06V 20/56 |
| 2022/0156576 A1* | 5/2022 | Rasouli | G06N 3/045 |
| 2022/0161818 A1* | 5/2022 | Solmaz | G08G 1/096725 |
| 2022/0242433 A1* | 8/2022 | Hecht | G06T 5/001 |
| 2022/0242453 A1* | 8/2022 | Hahn | G06V 20/58 |
| 2022/0250619 A1 | 8/2022 | Ikeda | |
| 2022/0289179 A1* | 9/2022 | Thomas | B60W 30/0956 |
| 2022/0383748 A1* | 12/2022 | Raj | G08G 1/0133 |
| 2022/0388534 A1* | 12/2022 | Schneemann | B60W 60/0011 |
| 2022/0405618 A1* | 12/2022 | Refaat | G06N 3/084 |
| 2023/0005273 A1* | 1/2023 | Irie | G06T 7/70 |
| 2023/0013965 A1* | 1/2023 | Miyake | G01C 21/3632 |
| 2023/0031375 A1* | 2/2023 | Mneimneh | G06N 5/01 |
| 2023/0043474 A1* | 2/2023 | Metz | B60W 60/0017 |
| 2023/0048304 A1* | 2/2023 | Nooteboom | G06V 20/58 |
| 2023/0064319 A1* | 3/2023 | Murahashi | B60W 10/20 |

FOREIGN PATENT DOCUMENTS

| | | | | |
|---|---|---|---|---|
| WO | 2017144356 A1 | | 8/2017 | |
| WO | WO-2017144356 A1 | * | 8/2017 | B60Q 1/525 |
| WO | 2020079066 A4 | | 6/2020 | |
| WO | 2021062595 A1 | | 4/2021 | |
| WO | 2021134169 A1 | | 7/2021 | |

OTHER PUBLICATIONS

Rosouli, A. et al., "Autonomous Vehicles That Interact With Pedestrians: A Survey of Theory and Practice", IEEE Transactions on Intelligent Transportation Systems ( Mar. 2020), 21(3), available at <https://ieeexplore.ieee.org/stamp/stamp.jsp?arnumber=8667866>.

Bieshaar, M. et al., "Detecting Intentions of Vulnerable Road Users Based on Collective Intelligence", arXiv:1809.03916 [cs.AI] available at <https://arxiv.org/ftp/arxiv/papers/1809/1809.03916.pdf>.

Rehder, E. et al., "Goal-Directed Pedestrian Prediction", 2015 IEEE International Conference on Computer Vision Workshop (ICCVW), 2015, pp. 139-147, available at <https://www.mrt.kit.edu/z/publ/download/2015/rehder_iccv15.pdf>.

U.S. Appl. No. 17/394,777, filed Aug. 5, 2021, Inferring Goals for Jaywalkers Within Intersections.

Zhang et al. ("Pedestrian Path Prediction for Autonomous Driving at Un-Signalized Crosswalk Using W/CDM and MSFM," in IEEE Transactions on Intelligent Transportation Systems, vol. 22, No. 5, pp. 3025-3037, May 2021 (abstract).

* cited by examiner

SYSTEMS AND METHODS FOR PREDICTION OF A JAYWALKER TRAJECTORY THROUGH AN INTERSECTION

BACKGROUND

An autonomous vehicle navigating a roadway needs to keep track of and predict what other moving or movable objects in the vehicle's environment ("actors"), such as other vehicles, bikes, pedestrians, animals, etc., are going to do. An autonomous vehicle can better avoid potentially hazardous situations by accurately predicting the trajectory of actors based on a combination of detailed map information and contextual information of other objects.

One of the major challenges for autonomous navigation is driving in urban environments that include uncertain road users (e.g., pedestrians, cyclists, etc.). Predicting where the uncertain road users ("URU") will be going can be very difficult because understanding their behavior is not intuitive and depends on various factors, such as demographics of the pedestrians, traffic dynamics, environmental conditions, etc. Typically, in order to predict the trajectory of such URUs, the autonomous vehicle may first identify a drivable area from the detailed map information. A drivable area (defined below) for autonomous vehicles is a simplified representation of a real driving environment that includes areas in which vehicles are reasonably expected to be able to drive (e.g., streets, lanes, parking areas, intersections, etc.). Identification of drivable areas helps facilitate driving decision processes such as by delineating areas such as sidewalks, buildings, etc. Generally, URUs within a drivable area can be assumed to have a destination that is outside of the drivable area and may follow a trajectory to the destination that includes exiting the drivable area at a target location on the drivable area boundary (e.g., corner of a sidewalk, a parking cutout, etc.). Information about potential target locations on the drivable area boundary can be used for predicting the trajectory of the actor for traversing the drivable area. Similarly, information about potential locations on a drivable area boundary that URUs may use to enter the drivable area can be used to predict potential conflicts with an autonomous vehicle trajectory. However, drivable areas may include large segments that cannot be used to infer meaningful information about smaller discrete target locations.

This document describes methods and systems that are directed to addressing the problems described above, and/or other issues.

SUMMARY

In various scenarios, systems and methods for controlling navigation of an autonomous vehicle are disclosed. The system may include a processor and a non-computer readable memory that includes programming instructions which when executed by the processor execute the methods of this disclosure. Optionally, a computer program product may include a memory device that contains programming instructions that are configured to cause a processor or an autonomous vehicle to execute the disclosed methods.

The methods may include generating a trajectory of an uncertain road user (URU) in proximity of a drivable area that a vehicle will traverse by first detecting a URU within a threshold distance of a drivable area that a vehicle is traversing or will traverse. The methods may then include receiving perception information relating to the URU, and using a plurality of features associated each of a plurality of entry points on a drivable area boundary that the URU can use to enter the drivable area to determine a likelihood that the URU will enter the drivable area from that entry point. The plurality of features may be computed based on the perception information. The methods may also include generating a trajectory of the URU using the plurality of entry points and the corresponding likelihoods, and controlling navigation of the vehicle while traversing the drivable area to avoid collision with the URU based on the trajectory.

In various embodiments, the plurality of features associated with that entry point may include, for example, a distance between the URU's current position and that entry point, time the URU will take to reach that entry point, a difference between a tangential vector of the drivable area boundary at that entry point and a heading of the URU, a distance between the URU's current position and a lane within the drivable area that is closest to that entry point, or a difference between a direction of the lane and the heading of the URU. In some examples, when the plurality of features associated with that entry point include the distance between the URU's current position and that entry point, the likelihood that the URU will enter the drivable area from that entry point may increase as the distance decreases. In other examples, when the plurality of features associated with that entry point include the time the URU will take to reach that entry point, the likelihood that the URU will enter the drivable area from that entry point may increase with a decrease in the time. In various other examples, when the plurality of features associated with that entry point include the difference between the tangential vector of the drivable area boundary at that entry point and the heading of the URU, the likelihood that the URU will enter the drivable area from that entry point may increase as the difference increases. In the plurality of features associated with that entry point include the distance between the URU's current position and the lane within the drivable area that is closest to that entry point, the likelihood that the URU will enter the drivable area from that entry point may increase as the distance decreases. If the plurality of features associated with that entry point include the difference between the direction of the lane and the heading of the URU, the likelihood that the URU will enter the drivable area from that entry point may increase as the difference increases.

Optionally, identifying the plurality of entry points on the drivable area boundary that the URU can use to enter the drivable area may include defining a plurality of hypotheses relating to the URU's trajectory for crossing the drivable area boundary, and using the perception information with the plurality of hypotheses for identifying the plurality of entry points. Examples of the hypotheses include the URU entering the drivable area from an entry point on the drivable area boundary that is closest to the URU's current position, the URU entering the drivable area from an entry point on the drivable area boundary where the drivable area boundary intersects with a heading vector of the URU, and/or the URU entering the drivable area from an entry point that is determined based on historical information about the drivable area.

In certain implementations, the methods may also include predicting whether the URU will enter the drivable area (e.g., based on the trajectory).

DETAILED DESCRIPTION

Figure 1:
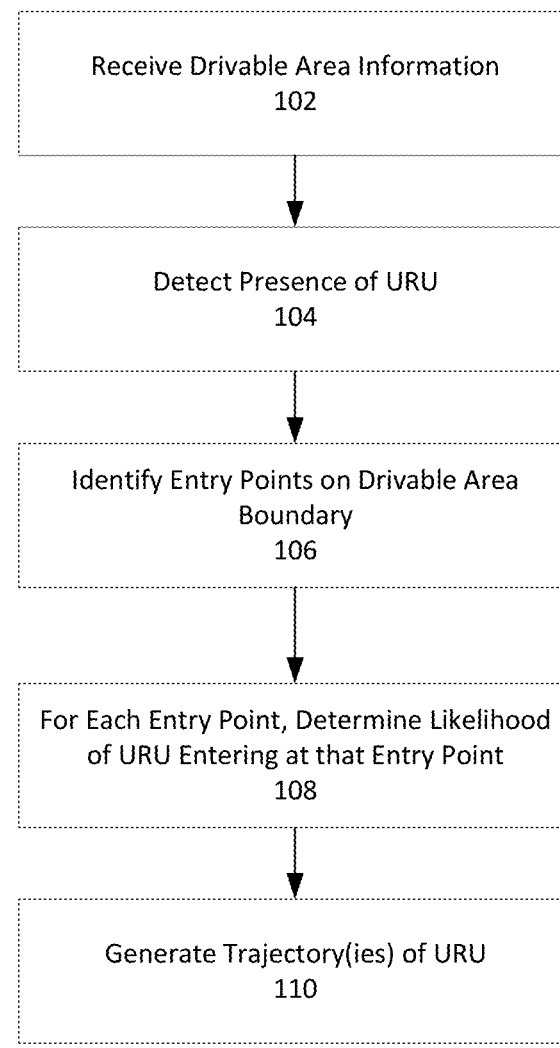
FIG. 1 illustrates a flow chart of an example method of identifying potential entry points into a drivable area and determining the trajectory of a URU.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Prediction of an actor's trajectory in an autonomous vehicle's environment includes identification of a goal representative of a target that the actor might care about at a given moment. For example, a vehicle following a lane (in a lane graph representation of an environment) might have the next lane as a goal, a pedestrian walking towards a crosswalk might have that crosswalk as a goal, or the like. In these examples, a crosswalk and a lane segment are small, discrete portions of a map that can be used for goal representation, among other things.

As discussed above, URUs when in the vicinity of a drivable area (e.g., an intersection) and/or when occupying a drivable area (such as when jaywalking, cross-walking, etc.), will typically have a destination outside the drivable area. The trajectory to such destination may include either entering the drivable area (in order to cross the drivable area for reaching the destination) and/or exiting the drivable area in order to reach the destination. As such, in order to reach such destinations, the URUs may follow a trajectory to the destination that includes either entering and/or exiting the drivable area at target locations on the drivable area boundary (a "goal"). Information about potential goal locations on the drivable area boundary can be used for predicting the trajectory of the actor for entering, exiting, and/or traversing the drivable area and/or potential conflict with an autonomous vehicle within the drivable area. However, existing methods typically only analyze a single drivable area entry or exit point.

For example, with respect to entry points into a drivable area that includes an intersection, current methods prematurely choose either the closest point at a nearby crosswalk/nearby curb or the intersection between the heading of the URU and the drivable area boundary, often resulting in false classifications (e.g., when the uncertain road user can enter a drivable area at multiple potential entry points). This document describes an automated method for identifying such multiple potential entry points into a drivable area that an URU may use, and analyzing the real-time state of the URU and the environment in order to predict the likelihood of the road user entering the drivable area at each potential entry point. For example, the system may define multiple entry points for a pedestrian standing idle at a crosswalk who may enter drivable area at various entry points, a pedestrian exiting a vehicle and potentially exiting a drivable area on either side of a road, or the like, and predict the likelihood of the pedestrian entering the drivable area at each potential entry point. Such analysis may allow an autonomous vehicle prediction system to infer, for example, one or more discrete goals that a pedestrian may be heading towards for entering and/or while traversing a drivable area. The prediction system may then use such goal locations for generating one or more trajectories with regard to where a pedestrian will be at a future time, such as ten to fifteen seconds from a current time (e.g., for traversing the drivable area), which may be used to navigate the autonomous vehicle to avoid collision with the pedestrian. Similarly, an autonomous vehicle motion planning system may utilize the information about the potential entry points to, for example, understand the spatial relations between different potential goal locations to handle situations where, for example, a pedestrian suddenly changes direction.

A "drivable area" is defined as the area where it is possible for an autonomous vehicle to drive. Examples of such drivable areas may include, without limitation, intersections, parking lots, roads, driveways, or the like. A drivable area may, optionally, be represented as a collection of one or more connected polygons (e.g., a 2-dimensional mesh). Information about drivable areas in an environment may be included in, for example, a vector map of the environment in the form of vector data (e.g., points, lines, polygons, etc.). The drivable area is contained within a drivable area boundary that demarcates the drivable area from non-drivable surface(s).

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform), and is not limited to autonomous vehicles. In another example, the techniques can be utilized in a human operated vehicle, an aviation or nautical context, or in any system using machine vision. Additionally, the techniques described herein can be used with real data (e.g., captured using sensor(s)), simulated data (e.g., generated by a simulator), or combinations thereof.

FIG. 1 illustrates a flow diagram illustrating a process by which a computing system may identify and classify potential entry points on a drivable area boundary that an URU may use to enter the drivable area. The computing system may be a stand-alone system that receives and processes sensor data captured by vehicles, or the computing system may be an on-board component of one of more of the vehicles themselves.

As shown in FIG. 1, a system may receive 102 drivable area information (e.g., a map) corresponding to an environment of an autonomous vehicle. The system may receive drivable area information from a data store such as, for example, a map data store. At least a portion of drivable area information may be stored in memory onboard of an autonomous vehicle, may be accessed from a remote electronic device (e.g., a remote server), may be transmitted to an autonomous vehicle via a traffic node positioned in the area in which the vehicle is traveling, may be transmitted to an autonomous vehicle from one or more sensors, and/or the like. The system may also receive information relating to one or more features of the environment, (e.g., status of a feature of the environment) such as detected objects, traffic signals and detected traffic signal states, or other aspects of the environment.

At 104, the system may detect the presence of a URU (stationary or moving) in an environment outside a drivable area while the autonomous vehicle is moving within the drivable area (i.e., the vicinity or proximity of the drivable area) and/or when the autonomous vehicle will traverse the drivable area. For example, the system may identify and collect perception information relating to URUs detected within a threshold distance of the autonomous vehicle's trajectory and/or the drivable area. For example, a presence detection system may capture images of the URU and process the images using a classifier (i.e., a trained model) to identify the presence of an object and classify the object as a vehicle, URU, or other moving actor. Other presence detection systems such as light detection and ranging (LiDAR) sensors may be employed. The presence detection system may use any now or hereafter known object recognition algorithms, video tracking algorithms, and computer vision algorithms to identify the moving actor. For example, the system may use a bounding box to identify an object in a first frame and rack movement of the box frame-to-frame iteratively over a time period.

Upon detection of the URU, the system may also collect perception information relating to the detected URUs In various implementations, the system may record one or more observations regarding the detected URUs in a continuous manner, the observations including, for example, a direction the URU is walking or travelling, a velocity associated with the URU, a direction or an angle at which the URU is looking (e.g., relative to autonomous vehicle).

At 106, the system may identify one or more entry points on the drivable area boundary that the URU can use to enter the drivable area. While the URU may enter the drivable area from any point on the drivable area boundary, the system determines a finite set of potential entry points based on, for example, one or more hypotheses or assumptions relating to URU's trajectory for crossing the drivable area boundary. In generating the hypotheses or assumptions, the system may consider, for example, historical behavior of URUs in that environment/drivable area, map information relating to the drivable area, historical behavior of URUs having similar perception information, one or more trajectory predictions for the URU, detected objects, traffic signals and detected traffic signal states, or other aspects of the environment, URU, etc. For each hypothesis, the system may identify a potential entry point based on, for example, information relating to the drivable area, information relating to the environment of the autonomous vehicles, the type of the URU, perception information relating to the URU, or the like.

Figure 2A:
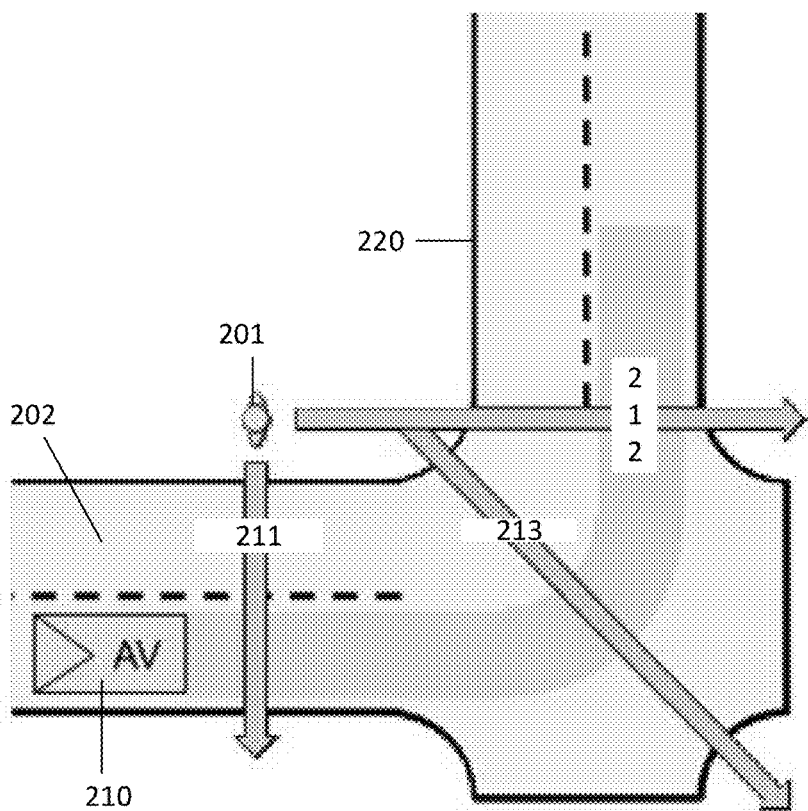
FIG. 2A illustrates an example drivable area including an intersection.
Figure 2B:
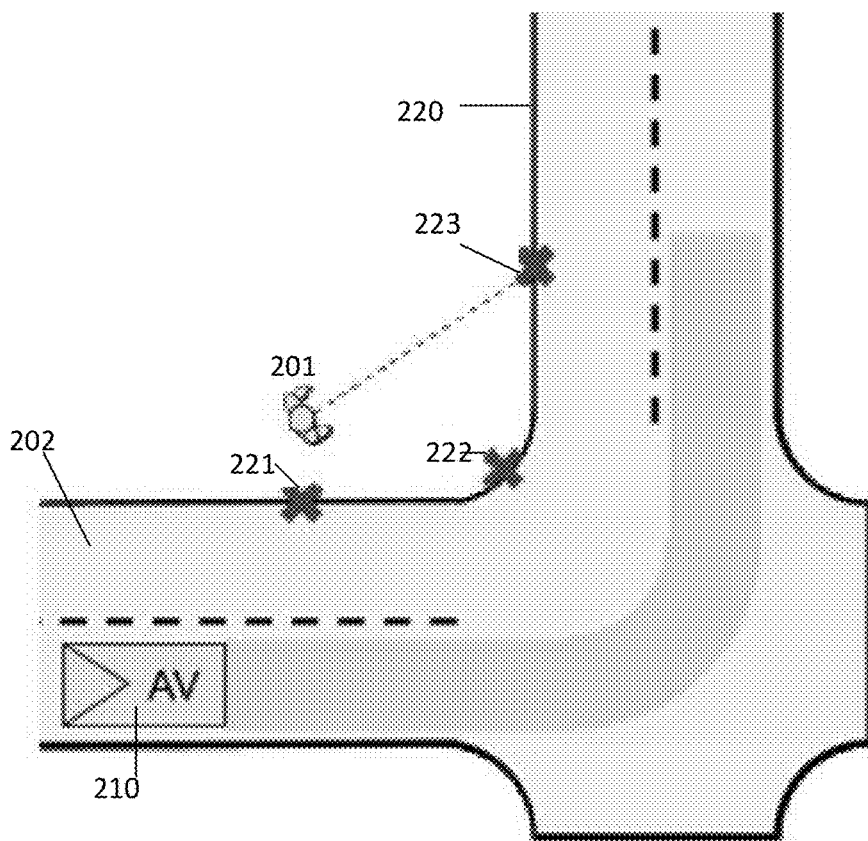
FIG. 2B illustrates the potential entry points on the drivable area boundary of the drivable are of FIG. 2A.

For example, for the URU 201 shown in FIG. 2A, the system may identify the entry points into the drivable are 202 for the following three assumptions relating to a potential URU trajectory for crossing the drivable area boundary 220 from its current position: (1) The URU will enter the drivable area from an entry point on the drivable area boundary which is closest to the URU's current position (211); (2) The URU will enter the drivable area from an entry point on the drivable area boundary where the drivable area boundary intersects with the heading vector of the URU (212); and (3) The URU will enter the drivable area from other entry points of interest on the drivable area boundary based on prior and/or historical information from the drivable area map (213) (e.g., a point that provides a shortest distance for crossing the drivable area, a point in proximity of the drivable area that has less traffic, lower curb zones on the drivable area boundary, points of entry determined based on historical information about the drivable area, points between crosswalk segments, a designated crosswalk, a signal, or the like). These hypotheses are provided by way of example and should not be considered limiting. As discussed above, one or more other hypotheses may be determined. The system may then use the URU's perception information (i.e., current location, speed, heading, etc.) and/or information relating to the drivable area in order to identify the potential entry points 221 (closest to the URU's current position), 222 (e.g., entry point for a crosswalk—not shown here), 223 (intersection point between the heading of the URU and the drivable area boundary) on the drivable area boundary 220 (shown in FIG. 2B).

At 108, the system may analyze one or more features associated with each identified entry point and determine a likelihood of the URU entering the drivable area using that entry point. Examples of such features may include, without limitation, distance between the URU's current position and the entry point, time needed by the URU to reach the entry point, a difference between the tangential vector of the drivable area boundary at the entry point and a heading vector of the URU, a distance between the URU's current position and the closest point of a lane that is closest to the entry point, a difference in a lane direction and the URU's heading, or the like. Each of the features may be assigned different weights based on, for example, the type of hypothesis, the type of the drivable area, the autonomous vehicle trajectory, etc. Specifically, the system may determine a suitable cost or reward function for determining a relative likelihood of the identified entry points being used by a URU and/or for assigning a likelihood score or value to each entry point based on an analysis of these or other features (described below).

The system may determine the distance between the URU's current position and the entry point as the Euclidean distance between the URU's position and the drivable area entry point. Optionally, the system may determine that the likelihood of the URU entering the drivable area increases as the distance between the URU's current position and that entry point decreases (or vice versa).

The system may determine the time needed by the URU to reach the entry point based on the current specific velocity of the URU (where, time=distance to the entry point/specific velocity). The specific velocity may be the component of the velocity vector in direction of the entry point being analyzed, as determined by the dot product of the URU's velocity vector and the unit vector pointing from the URU to the entry point (and assuming that the URU is moving with a constant velocity). In some embodiments, the system may use an average velocity estimation for a type of a URU for determining the time to reach the entry point (e.g., for a stationary URU, the system may use a standard average velocity for the type of the detected URU). Optionally, the system may determine that the likelihood of the URU entering the drivable area increases as the time to reach the entry point decreases (or vice versa).

The system may determine the difference between the tangential vector of the drivable area boundary at the entry point and a heading vector of the URU as an angular difference between the same. Optionally, the system may determine that the likelihood of the URU entering the drivable area increases as the angular difference increases (or vice versa).

The system may determine the distance between the URU's current position and the closest point of a lane that is closest to the entry point as the Euclidean distance between the URU's position and the closest point of a lane. The lane may be a lane in the drivable area that is closest to the entry point being analyzed. Optionally, the system may determine that the likelihood of the URU entering the drivable area increases as the determined distance decreases (or vice versa).

The system may determine the difference in a lane direction and the URU's heading as angular distance between the travel direction vector of a lane that is closest to the entry point and the heading vector of the URU. Optionally, the system may determine that the likelihood of the URU entering the drivable area increases as the determined angular distance increases (or vice versa).

In various embodiments, the system can use algorithms such as Random Forest classifier, Social-LSTM, Social-GAN, INtentNet, DESIRE, R2P2 and PRECOG, or the like for identifying the entry points and/or determining the likelihood of the URU entering the drivable area using that entry point At 110, the system may use the identified entry points and the determined likelihood as one or more URU goals to a trajectory forecasting algorithm (e.g., a machine learning model trained to forecast URU trajectories) for generating one or more potential trajectories of the URU that the URU will be expected to follow. For example, the one or more trajectories may be determined based on one or more of the identified entry points as inferred goals of the URU. Each potential trajectory will include a path and corresponding time elements by which the URU will reach a target location from its present location and may, optionally, predict whether the URU will enter (and/or cross) the drivable area. For example, a potential trajectory may include a path to an identified entry point and the time it will take for the URU to enter the drivable area, via the entry point. Optionally, one or more of the potential trajectories may include a path that does not enter the drivable area. Techniques for determining a URU trajectory, given a target location, are well known in the art, and any known or to be known technique for determining a URU trajectory can be used. Example trajectory forecasting algorithms are disclosed in, for example, Chang et al. "Argoverse: 3D tracking and Forecasting with Rich Maps", published Nov. 6, 2019 at https://arxiv.org/abs/1911.02620, and include algorithms such as constant velocity models with a standard path following model, Random Forest classifier, Social-LSTM, Social-GAN, INtentNet, DESIRE, R2P2 and PRECOG, among other algorithms.

The predicted trajectories may be used by an autonomous vehicle in a variety of ways. For example, a prediction system of an autonomous vehicle may use the predicted trajectories to predict the behavior or trajectories of URUs within a drivable area. As another example, a motion planning system of the autonomous vehicle may use the predicted trajectories to output an autonomous vehicle trajectory for traversing the drivable area. For instance, a prediction system may predict that a particular pedestrian in the environment of the autonomous vehicle will likely head towards a particular entry point on the drivable area boundary and may make one or more decisions concerning the operation of the autonomous vehicle (e.g., stop, swerve, speed, etc.) based on this behavior in order to avoid conflict with the URU once it enters the drivable area.

The system may continuously identify or recalculate the entry points as the URU moves or travels through the environment. In other words, the entry points (or goals) may not necessarily be static in that a URU may change his or her mind or in that a URU may not necessarily travel in a straight line towards his or her goal. Accordingly, the system may make one or more observations regarding one or more of the URUs or continuously track one or more of the URUs to enable forecasting of potential trajectories of the URU until the autonomous vehicle has passed the URU, the URU has exited the environment, or the like.

While the above disclosure describes systems and methods for inferring goals of a URU detected outside a drivable area by identifying and analyzing potential entry points of the URU into the drivable area, it is also important to predict the trajectory of a URU that is detected within a drivable area. For example, a jaywalking pedestrian within an intersection may have uncertain paths, velocities, or progression toward a goal including an exit point on the drivable area boundary in order to reach a safe area. As such, the URUs are typically attempting to cross the drivable area with some curb or goal point on the opposite side (often uncertain), where information about the potential goal points may be used by URU trajectory prediction algorithms. Current methods for generating URU trajectories through a drivable are based the assumption that entry points and exit points are directly in front of and behind the URU, respectively. However, that is often not the case and there are times that the entry point and/or the exit point cannot be reasonably calculated based on the above assumption. For example, a pedestrian walking parallel to a lane while going through an intersection might not have a curb directly in front of them for hundreds of meters, which is a computationally infeasible target point for predicting a trajectory.

The following disclosure describes systems and methods for inferring goals points or exit points (without the above assumption of it being directly in front of the URU), scoring them based on the URU's observed behavior, and predicting a trajectory that the URU may follow towards those goal points. The goal points may be points outside the drivable area and/or on the drivable area boundary. The current systems and methods are based on an assumption here that a URU in a drivable area (e.g., an intersection) is progressing toward some "curb" or non-road surface in order to get out of the way of the flow of traffic, in particular when the URU is within the drivable area against the corresponding traffic laws. Given that assumption, the systems and methods of this disclosure identify a set of potential goal points around the drivable area, such that the set is not too large to be computationally intensive to evaluate and is large enough to span a representative set of all reasonable goal points. For example, in the intersection 400 shown in FIG. 4A, there are four corner curbs (401*a-d*) and two medians (402*a* and 402*b*), and the system may create target goal points at each of the four corners curbs (401*a-d*) and/or the two medians (402*a* and 402*b*), as that is where a URU is typically most likely to exit the intersection.

Figure 3:
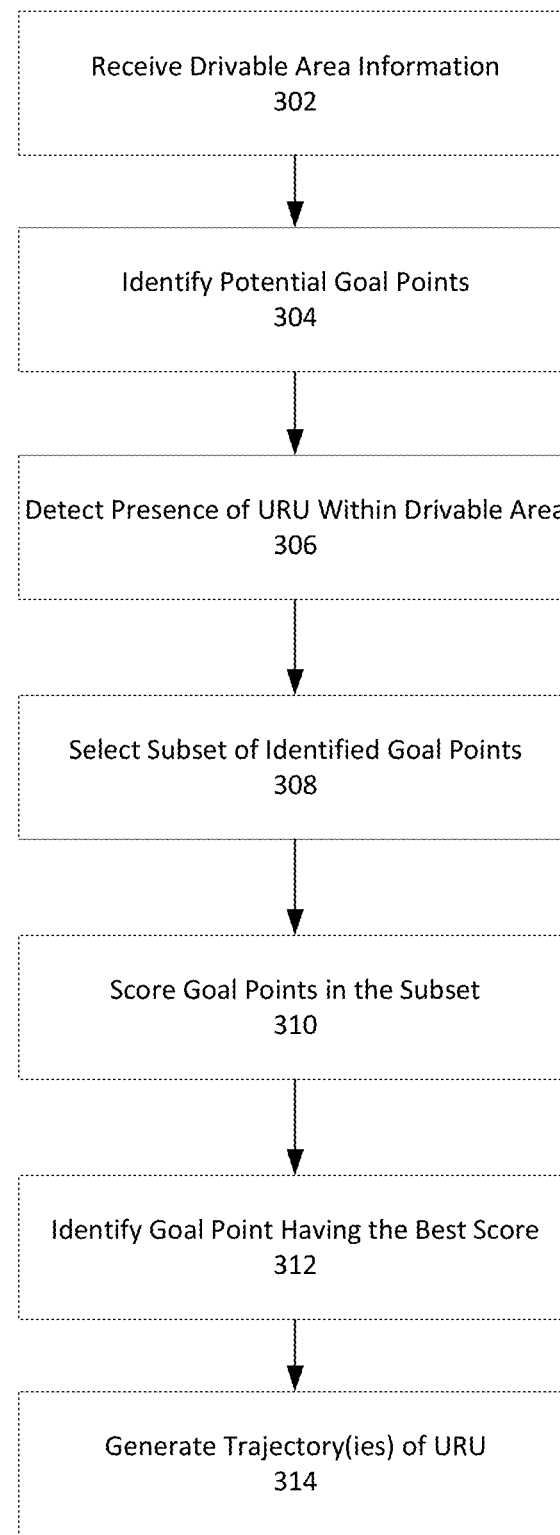
FIG. 3 illustrates a flow chart of an example method of identifying a target that a URU within a drivable area is heading towards, and determining the trajectory of the URU.

FIG. 3 illustrates a flow diagram illustrating a process by which a computing system may identify a target that a URU may be heading towards for exiting a drivable area by identifying and scoring potential goal points. The computing system may be a stand-alone system that receives and processes sensor data captured by vehicles, or the computing system may be an on-board component of one of more of the vehicles themselves.

As shown in FIG. 3, a system may receive 302 drivable area information (e.g., a map) corresponding to an environment of an autonomous vehicle. The system may receive drivable area information from a data store such as, for example, a map data store. At least a portion of drivable area information may be stored in memory onboard of an autonomous vehicle, may be accessed from a remote electronic device (e.g., a remote server), may be transmitted to an autonomous vehicle via a traffic node positioned in the area in which the vehicle is traveling, may be transmitted to an autonomous vehicle from one or more sensors, and/or the like. The system may also receive information relating to one or more features of the environment, (e.g., status of a feature of the environment) such as detected objects, traffic signals and detected traffic signal states, or other aspects of the environment.

Figure 4A:
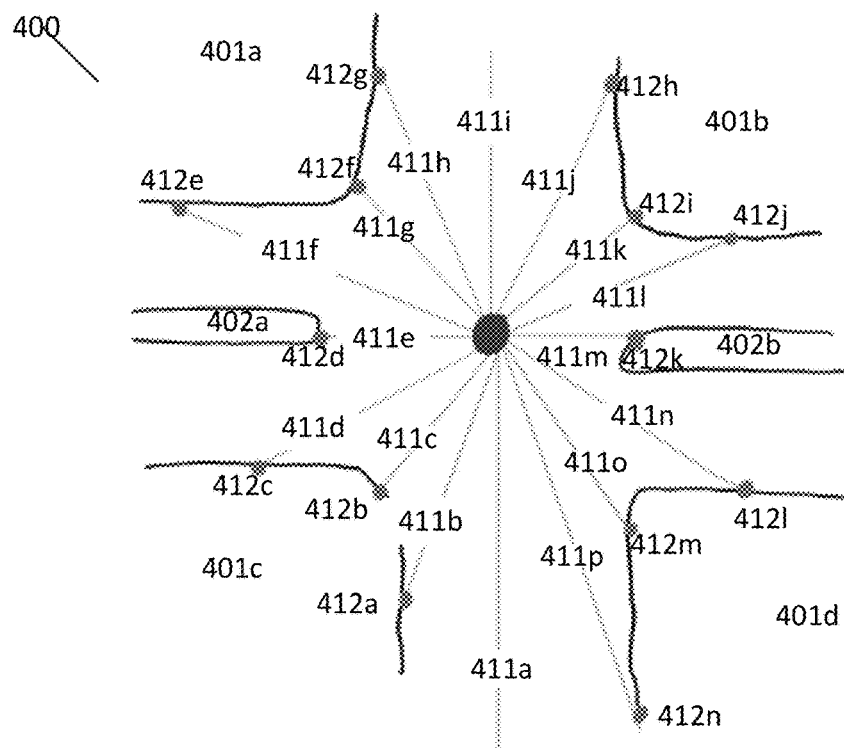
FIG. 4A illustrates an example representation of drivable area including an intersection.

At 304, the system may identify and/or receive a set of potential goal points around the drivable area. For example, the system may use a ray-tracing algorithm for identifying the set of goal points. The ray-tracing algorithm includes selection of a point that is approximately located at the center of the drivable area polygon (e.g., center of a polygon that represents an intersection), and tracing virtual rays from the selected center outwards (i.e., towards the drivable area boundary) in a plurality of directions (e.g., at about 5-15° separation, about 6-14° separation, about 7-13° separation, about 8-12° separation, about 9-11° separation, about 100 separation, about 10° separation, or the like). The points at which the virtual rays intersect with the drivable area boundary may be identified as potential goal points. Any virtual ray that does not intersect with a drivable area boundary within a certain threshold distance is discarded. For example, as shown in FIG. 4A, the drivable area includes an intersection 400 that is surrounded by the following non-drivable surfaces: four corner curbs (401*a-d*) and two medians (402*a* and 402*b*). For identifying potential goal points for a URU within the intersection 400, the system may first identify a point 410 that is approximately located at the center of the intersection. For example, for an intersection, the point may be identified as the centroid of all intersection lane segments that are a part of this intersection, where such centroid is expected to be approximately in the middle of any intersection regardless of intersection geometry. The system may then use the point 410 as the centroid for tracing virtual rays 411*a-p* outwards in all directions (e.g., at about 10° separation), and intersection points with the non-drivable surfaces 412*a-n* in and/or around the drivable area may be identified as potential goal points. Virtual rays 411*a* and 411*i* may be discarded since they do no intersect with the drivable area boundary.

The identification of potential goal points corresponding to a drivable area may be performed in real-time and/or before the autonomous vehicle is traversing the drivable area. For example, in various embodiments, the system may store information pertaining to the set of potential goal points corresponding to a drivable are in one or more data stores; and may retrieve the information when needed. This information may include, for example, an identifier associated with a drivable area, information relating to the drivable area, location and identification of various potential goal points, and/or the like.

At 306, the system may detect the presence of a URU within the drivable area while the autonomous vehicle is traversing the drivable area and/or is going to traverse the drivable area within a threshold period of time. For example, the system may identify and collect perception information relating to URUs detected within a threshold distance of the autonomous vehicle's trajectory and/or the drivable area. For example, a presence detection system may capture images of the URU and process the images using a classifier (i.e., a trained model) to identify the presence of an object and classify the object as a vehicle, URU, or other moving actor. Other presence detection systems such as LiDAR sensors may be employed. The presence detection system may use any now or hereafter known object recognition algorithms, video tracking algorithms, and computer vision algorithms to identify the moving actor. For example, the system may use a bounding box to identify an object in a first frame and rack movement of the box frame-to-frame iteratively over a time period.

Upon detection of the URU, the system may also collect perception information relating to the detected URUs In various implementations, the system may record one or more observations regarding the detected URUs in a continuous manner, the observations including, for example, a direction the URU is walking or travelling, a velocity associated with the URU, a direction or an angle at which the URU is looking (e.g., relative to autonomous vehicle).

Figure 4B:
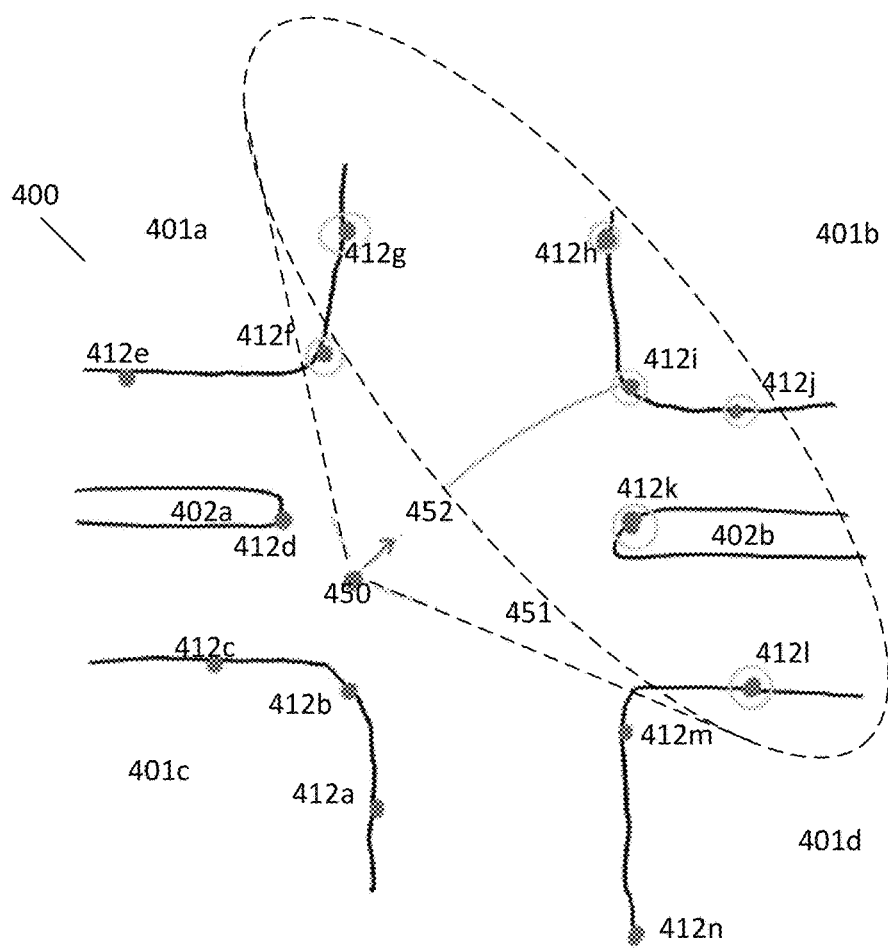
FIG. 4B illustrates the identified potential goal points in the drivable area of FIG. 4A.

Upon detection of the URU, the system may use the perception information of the detected URU to first select a subset of the potential goal points including goal points likely to be used by the exit the drivable area (308). For example, the system may select the subset of the points that are located within a conical area (or another suitable shape) in front of the URU. Specifically, the system may identify the conical area by roughly aligning the detected heading of the URU with the conical area where the URU's current position forms the apex of the conical area. The vertical angle of the conical area may be about 200-160°, about 300-150°, about 40°-140°, about 500-130°, about 600-120°, about 700-110°, about 100°, about 110°, about 120°, about 130°, about 140°, about 150°, or the like. Referring to FIG. 4B, when a URU 450 is detected within the drivable area of FIG. 4A, the system may identify the subset of the potential goal points as the set of points 412*f-l* that lie within the conical area 451 determined based on the heading 452 of the URU 450.

The system may then score each of the potential goal points in the selected subset (310), the score of a goal point being indicative of a likelihood that that URU will exit the drivable area using that goal point. Specifically, the system may determine a suitable cost or reward function for determining a relative likelihood of the identified goal points and/or for assigning a likelihood score or value to each goal point based on an analysis of these or other factors (described below).

In some embodiments, the system may use a loss function for computing a score for each goal point in the selected subset, the loss function including a weighted combination of the alignment of a goal point with the URU's heading and the time that the URU will take to reach that goal point. The respective weights may be determined manually and/or using any now or hereafter known machine learning algorithms based on training data. In the loss function, the loss associated with a potential goal point increases as the difference in alignment of the goal point with the URU's heading increases. For example, if a goal point is directly in front of the URU (i.e., URU heading aligned with the goal point) then it has lower loss compared to another goal point that has a difference in alignment with the URU heading. In the loss function, the loss associated with a potential goal point increases as the time that the URU will take to reach that goal point increases. For example, if the URU is approaching a goal point then the goal point has a lower loss compared to a goal point that is further away. On the other hand, if it is determined based on a current velocity of the URU that the URU will soon surpass a goal point without stopping, then that goal point may have a higher loss function compared to goal points beyond that goal point. For example, if the URU 450 in FIG. 4B is close to the median 402b but continuing on to the corner curb 401b (determined based on, for example, current velocity and/or acceleration/deceleration of the URU—e.g., if the URU is close to the goal but does not appear to be slowing down or stopping, the system may determine that the URU will likely not stop at the goal and will continue going to another goal), then the goal point 412k will have a higher loss function compared to, for example, the goal points 412h, 412i, 412k. Therefore, given a URU's location, heading, and current velocity, the system may use the loss function to compute a score for each goal point in the subset.

At 312, the system may identify the goal point associated with the best score (the highest or the least score depending on whether a cost function is used or a reward function is used for determining the score), as the target point that the URU will head towards. While the disclosure describes identifying a single goal point as the likely target of a URU, the disclosure is not so limiting, and more than one likely targets may be identified using the methods discussed above.

The system may then use the identified target in a trajectory forecasting algorithm (e.g., a machine learning model trained to forecast URU trajectories examples of which are discussed above) for generating one or more potential trajectories of the URU that the URU will be expected to follow (314). For example, the one or more trajectories may be determined based on the perception information of the URU and the identified target by creating a Bezier curve from the URU's current location to the identified target, where the Bezier curve takes into account the URU's current heading and predicts a smooth path to the target. The generated trajectory will, therefore, include a path and corresponding time elements by which the URU will reach the target from its present location.

The predicted trajectory may be used by an autonomous vehicle in a variety of ways. For example, a motion planning system of the autonomous vehicle may use the predicted trajectory to output an autonomous vehicle trajectory for traversing the drivable area without colliding with the URU. For instance, the system may make one or more decisions concerning the operation of the autonomous vehicle (e.g., stop, swerve, speed, etc.) based on the trajectory in order to avoid conflict with the URU in the drivable area.

In various embodiments, the system may continuously identify or recalculate the goal point until the URU has exited the drivable area and/or until the autonomous vehicle has passed the URU such that the autonomous vehicle's trajectory cannot conflict with that of the URU. In other words, the goal point may not necessarily be static in that a URU may change his or her mind or in that a URU may not necessarily travel in a straight line towards his or her goal. Accordingly, the system may make one or more observations regarding one or more of the URUs or continuously track one or more of the URUs to enable forecasting of potential trajectories of the URU until the autonomous vehicle has passed the URU, the URU has exited the drivable area, or the like.

It should be noted that while the above disclosure describes a method for identifying an entry point into a drivable area, and a method for identifying an exit point from the drivable area, the result and/or intermediate analysis from either method may be used as an input into the other. For example, information relating to the entry points, the corresponding likelihoods, and/or the trajectory from the methods of FIG. 1 may be used to select the subset of goal points and/or for scoring the goal points in the methods of FIG. 3. Similarly, the generated trajectory from FIG. 3 may be used as an input into the methods of FIG. 1 for identifying re-entry points into the same drivable area and/or entry points into another drivable area.

Figure 5:
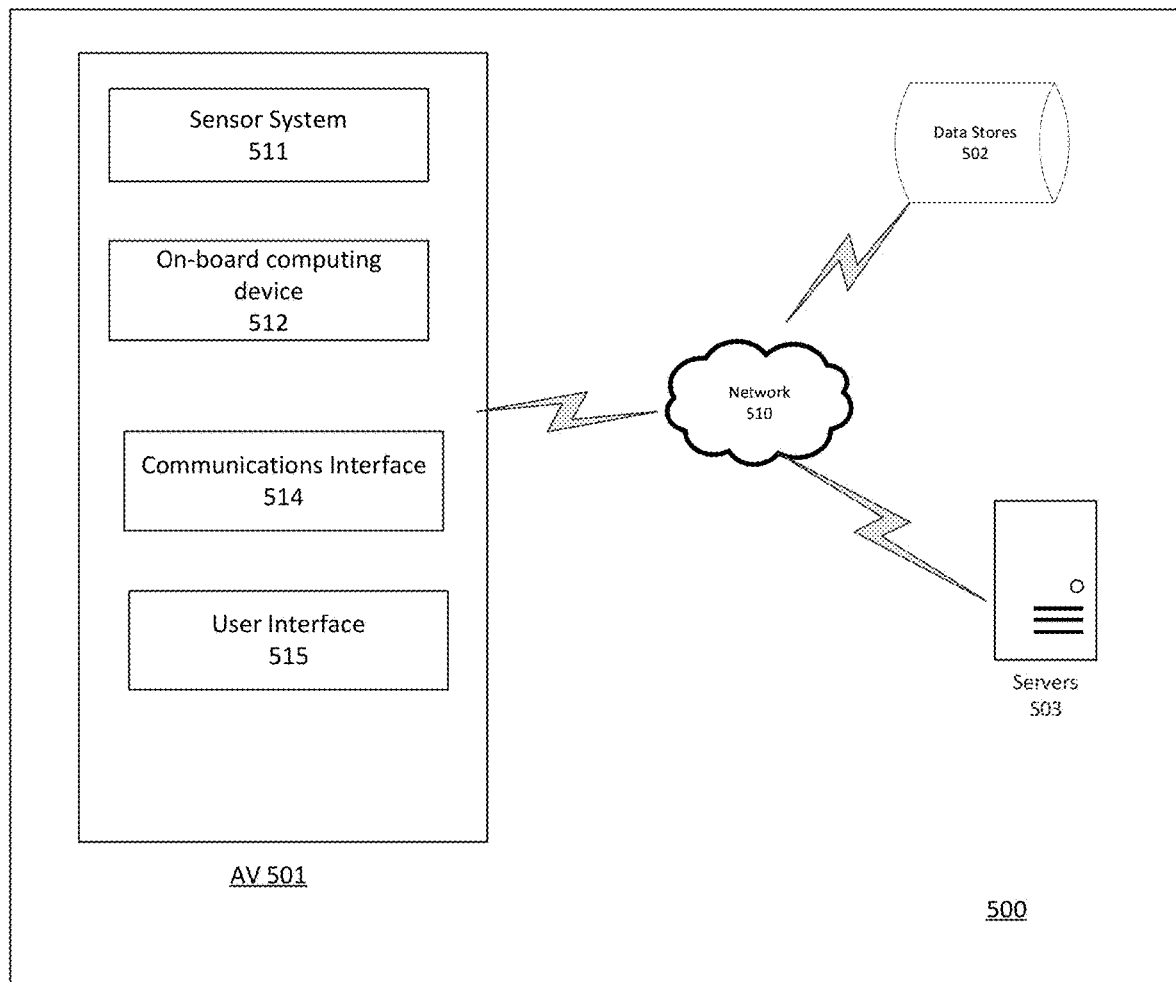
FIG. 5 is a block diagram illustrating an example autonomous vehicle system.

FIG. 5 is a block diagram illustrating an example system 500 that includes an autonomous vehicle 501 in communication with one or more data stores 502 and/or one or more servers 503 via a network 510. Although there is one autonomous vehicle shown, multiple autonomous vehicles may be coupled to each other and/or coupled to data stores 502 and/or servers 503 over network 510. Network 510 may be any type of network such as a local area network (LAN), a wide area network (WAN) such as the Internet, a cellular network, a satellite network, or a combination thereof, and may be wired or wireless. Data store(s) 502 may be any kind of data store such as, without limitation, map data store(s), traffic information data store(s), user information data store(s), point of interest data store(s), or any other type of content data store(s). Server(s) 503 may be any kind of servers or a cluster of servers, such as, without limitation, Web or cloud servers, application servers, backend servers, or a combination thereof.

As illustrated in FIG. 5, the autonomous vehicle 501 may include a sensor system 511, an on-board computing device 512, a communications interface 514, and a user interface 515. Autonomous vehicle 501 may further include certain components (as illustrated, for example, in FIG. 10) included in vehicles, such as, an engine, wheel, steering wheel, transmission, etc., which may be controlled by the on-board computing device 512 using a variety of communication signals and/or commands, such as, for example, acceleration signals or commands, deceleration signals or commands, steering signals or commands, braking signals or commands, etc.

The sensor system 511 may include one or more sensors that are coupled to and/or are included within the autonomous vehicle 501. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 501, information about the environment itself, information about the motion of the autonomous vehicle 501, information about a route of the autonomous vehicle, or the like. As autonomous vehicle 501 travels over a surface, at least some of the sensors may collect data pertaining to the surface.

The LiDAR system may include a sensor configured to sense or detect objects and/or actors in an environment in which the autonomous vehicle 501 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 3600 horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 501 such as, without limitation, other vehicles (autonomous or driven), robots, satellites, etc.

Figure 6:
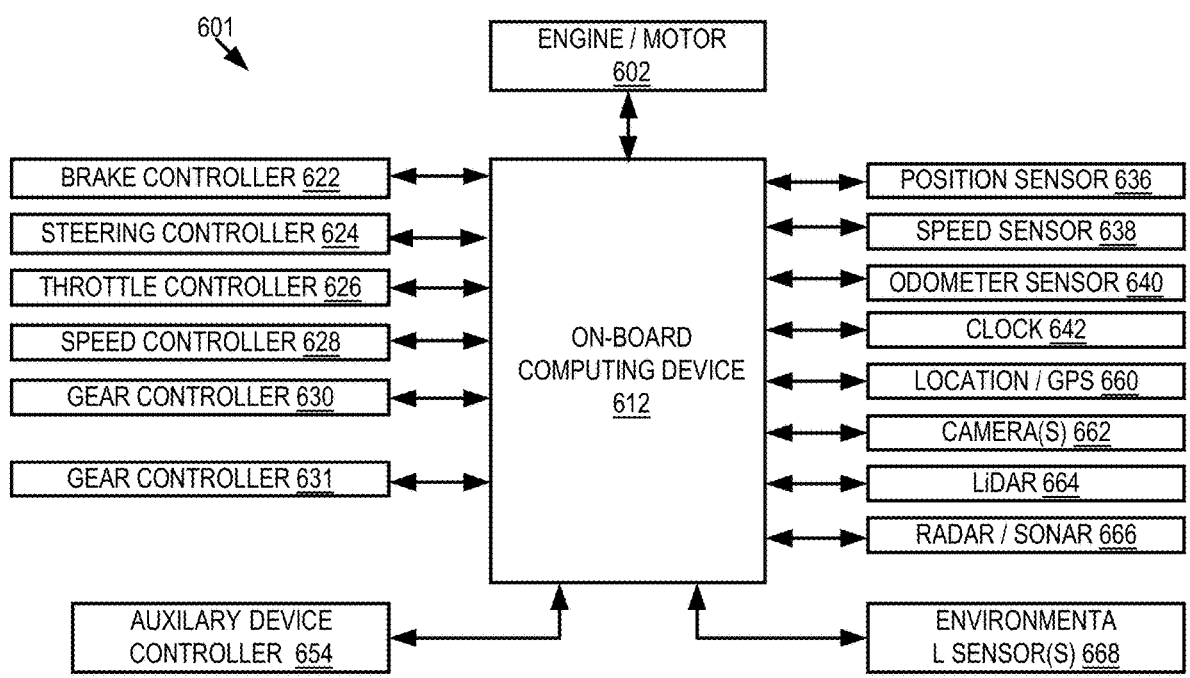
FIG. 6 illustrates an example vehicle controller system.

FIG. 6 illustrates an example system architecture for a vehicle 601, such as the autonomous vehicle 501 of FIG. 1 autonomous vehicle. The vehicle 601 may include an engine or motor 602 and various sensors for measuring various parameters of the vehicle and/or its environment. Operational parameter sensors that are common to both types of vehicles include, for example: a position sensor 636 such as an accelerometer, gyroscope and/or inertial measurement unit; a speed sensor 638; and an odometer sensor 640. The vehicle 601 also may have a clock 642 that the system architecture uses to determine vehicle time during operation. The clock 642 may be encoded into the vehicle on-board computing device 612. It may be a separate device, or multiple clocks may be available.

The vehicle 601 also may include various sensors that operate to gather information about the environment in which the vehicle is traveling. These sensors may include, for example: a location sensor 660 such as a GPS device; object detection sensors such as one or more cameras 662; a LiDAR sensor system 664; and/or a radar and or and/or a sonar system 666. The sensors also may include environmental sensors 668 such as a precipitation sensor and/or ambient temperature sensor. The object detection sensors may enable the vehicle 601 to detect objects that are within a given distance or range of the vehicle 601 in any direction, while the environmental sensors collect data about environmental conditions within the vehicle's area of travel. The system architecture will also include one or more cameras 662 for capturing images of the environment.

During operations, information is communicated from the sensors to an on-board computing device 612. The on-board computing device 612 analyzes the data captured by the sensors and optionally controls operations of the vehicle based on results of the analysis. For example, the on-board computing device 612 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers such as an auxiliary device controller 654.

Geographic location information may be communicated from the location sensor 660 to the on-board computing device 612, which may then access a map of the environment that corresponds to the location information to determine known fixed features of the environment such as streets, buildings, stop signs and/or stop/go signals. Captured images from the cameras 662 and/or object detection information captured from sensors such as a LiDAR system 664 is communicated from those sensors to the on-board computing device 612. The object detection information and/or captured images may be processed by the on-board computing device 612 to detect objects in proximity to the vehicle 601. In addition or alternatively, the vehicle 601 may transmit any of the data to a remote server system 503 (FIG. 5) for processing. Any known or to be known technique for making an object detection based on sensor data and/or captured images can be used in the embodiments disclosed in this document.

The on-board computing device 612 may obtain, retrieve, and/or create map data that provides detailed information about the surrounding environment of the autonomous vehicle 601. The on-board computing device 612 may also determine the location, orientation, pose, etc. of the AV in the environment (localization) based on, for example, three dimensional position data (e.g., data from a GPS), three dimensional orientation data, predicted locations, or the like. For example, the on-board computing device 612 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 612 in analyzing the surrounding environment of the autonomous vehicle 601.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 612 may also include and/or may receive information relating to the trip or route of a user, real-time traffic information on the route, or the like.

The on-board computing device 612 may include and/or may be in communication with a routing controller 631 that generates a navigation route from a start position to a destination position for an autonomous vehicle. The routing controller 631 may access a map data store to identify possible routes and road segments that a vehicle can travel on to get from the start position to the destination position. The routing controller 631 may score the possible routes and identify a preferred route to reach the destination. For example, the routing controller 631 may generate a navigation route that minimizes Euclidean distance traveled or other cost function during the route, and may further access the traffic information and/or estimates that can affect an amount of time it will take to travel on a particular route. Depending on implementation, the routing controller 631 may generate one or more routes using various routing methods, such as Dijkstra's algorithm, Bellman-Ford algorithm, or other algorithms. The routing controller 631 may also use the traffic information to generate a navigation route that reflects expected conditions of the route (e.g., current day of the week or current time of day, etc.), such that a route generated for travel during rush-hour may differ from a route generated for travel late at night. The routing controller 631 may also generate more than one navigation route to a destination and send more than one of these navigation routes to a user for selection by the user from among various possible routes.

In various embodiments, an on-board computing device 612 may determine perception information of the surrounding environment of the autonomous vehicle 601. Based on the sensor data provided by one or more sensors and location information that is obtained, the on-board computing device 612 may determine perception information of the surrounding environment of the autonomous vehicle 601. The perception information may represent what an ordinary driver would perceive in the surrounding environment of a vehicle. The perception data may include information relating to one or more objects in the environment of the autonomous vehicle 601. For example, the on-board computing device 612 may process sensor data (e.g., LiDAR or RADAR data, camera images, etc.) in order to identify objects and/or features in the environment of autonomous vehicle 601. The objects may include traffic signals, road way boundaries, other vehicles, pedestrians, and/or obstacles, etc. The on-board computing device 612 may use any now or hereafter known object recognition algorithms, video tracking algorithms, and computer vision algorithms (e.g., track objects frame-to-frame iteratively over a number of time periods) to determine the perception.

In some embodiments, the on-board computing device 612 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 612 may perform one or more prediction and/or forecasting operations. For example, the on-board computing device 612 may predict future locations, trajectories, and/or actions of one or more objects. For example, the on-board computing device 612 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 601, the surrounding environment, and/or their relationship(s). For example, if an object is a vehicle and the current driving environment includes an intersection, the on-board computing device 612 may predict whether the object will likely move straight forward or make a turn. If the perception data indicates that the intersection has no traffic light, the on-board computing device 612 may also predict whether the vehicle may have to fully stop prior to enter the intersection.

In various embodiments, the on-board computing device 612 may determine a motion plan for the autonomous vehicle. For example, the on-board computing device 612 may determine a motion plan for the autonomous vehicle based on the perception data and/or the prediction data. Specifically, given predictions about the future locations of proximate objects and other perception data, the on-board computing device 612 can determine a motion plan for the autonomous vehicle 601 that best navigates the autonomous vehicle relative to the objects at their future locations.

In one or more embodiments, the on-board computing device 612 may receive predictions and make a decision regarding how to handle objects and/or actors in the environment of the autonomous vehicle 601. For example, for a particular actor (e.g., a vehicle with a given speed, direction, turning angle, etc.), the on-board computing device 612 decides whether to overtake, yield, stop, and/or pass based on, for example, traffic conditions, map data, state of the autonomous vehicle, etc. Furthermore, the on-board computing device 612 also plans a path for the autonomous vehicle 601 to travel on a given route, as well as driving parameters (e.g., distance, speed, and/or turning angle). That is, for a given object, the on-board computing device 612 decides what to do with the object and determines how to do it. For example, for a given object, the on-board computing device 612 may decide to pass the object and may determine whether to pass on the left side or right side of the object (including motion parameters such as speed). The on-board computing device 612 may also assess the risk of a collision between a detected object and the autonomous vehicle 601. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 612 may execute one or more control instructions to perform a cautious maneuver (e.g., mildly slow down, accelerate, change lane, or swerve). In contrast, if the collision cannot be avoided, then the on-board computing device 612 may execute one or more control instructions for execution of an emergency maneuver (e.g., brake and/or change direction of travel).

As discussed above, planning and control data regarding the movement of the autonomous vehicle is generated for execution. The on-board computing device 612 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and/or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

In non-AV embodiments, such as with vehicles that are driven by human operators, a processor hardware and computer-readable hardware that are part of an electronic devices that is contained with the vehicle, such as an dashboard navigation system or a mobile electronic device of the operator may create the motion plan. In such situations, the electronic device may output the trajectories planned by the processor via a display, an audio speaker, or both. In addition, some parts of the processor may include a transceiver of an electronic device that receives certain perception data (such as weather data) from a remote server via wireless communication.

Referring back to FIG. 5, the communications interface 514 may be configured to allow communication between autonomous vehicle 501 and external systems, such as, for example, external devices, sensors, other vehicles, servers, data stores, databases etc. Communications interface 514 may utilize any now or hereafter known protocols, protection schemes, encodings, formats, packaging, etc. such as, without limitation, Wi-Fi, an infrared link, Bluetooth, etc. User interface system 515 may be part of peripheral devices implemented within a vehicle 501 including, for example, a keyboard, a touch screen display device, a microphone, and a speaker, etc.

Figure 7:
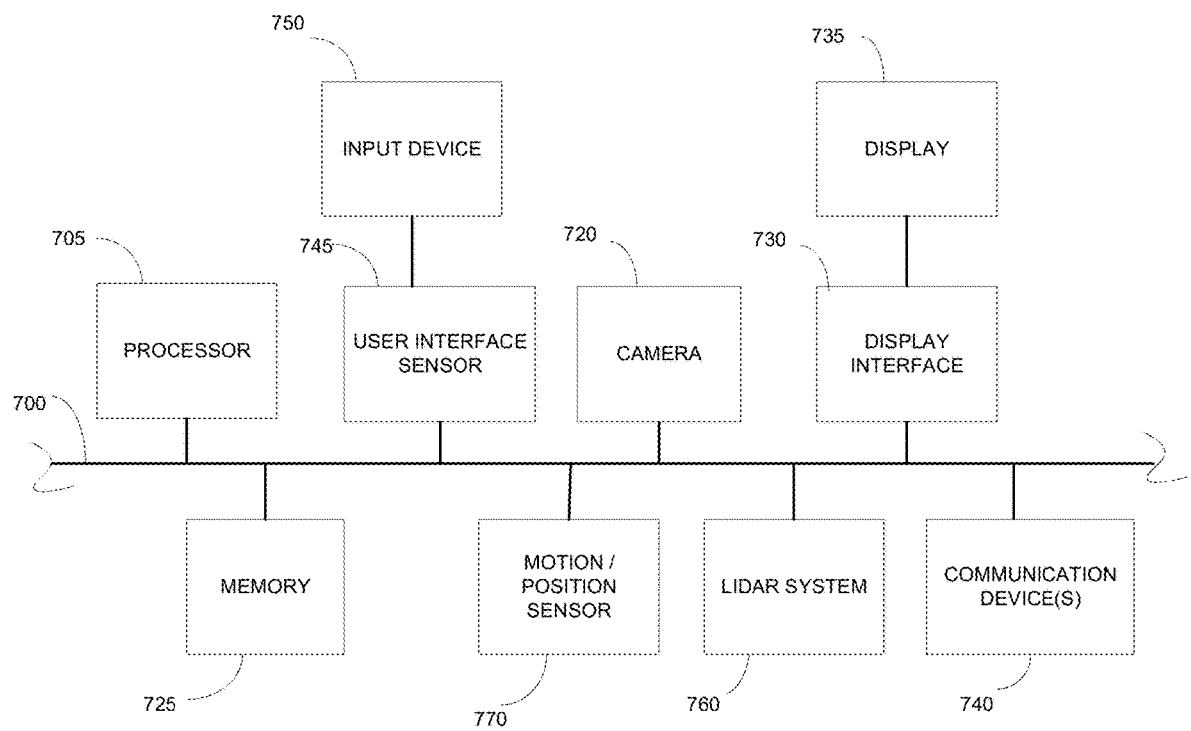
FIG. 7 is a block diagram that illustrates various elements of a possible electronic system, subsystem, controller and/or other component of an autonomous vehicle, and/or external electronic device.

FIG. 7 depicts an example of internal hardware that may be included in any of the electronic components of the system, such as internal processing systems of the autonomous vehicle, external monitoring and reporting systems, or remote servers. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 730 may permit information from the bus 700 to be displayed on a display device 735 in visual, graphic or alphanumeric format, such on an in-dashboard display system of the vehicle. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard or keypad, a joystick, a touchscreen, a touch pad, a remote control, a pointing device and/or microphone. Digital image frames also may be received from a camera 720 that can capture video and/or still images. The system also may receive data from a motion and/or position sensor 770 such as an accelerometer, gyroscope or inertial measurement unit. The system also may receive data from a LiDAR system 760 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object." As used herein, URUs may include pedestrians, cyclists, individuals on roller skates, rollerblades, wheelchairs, individuals, or people in general, etc. A "trajectory" of an actor that a vehicle's perception or prediction systems may generate refers to the predicted path that the actor will follow over a time horizon, along with the predicted speed of the actor and/or position of the actor along the path at various points along the time horizon.

As used herein, the term "environment" may include an operating environment, a physical environment, a real world environment, etc. Features of an environment may include markings, tangible features (e.g., sidewalks, lamp posts, obstructions, etc.), intangible features (e.g., traffic levels), colors, textures, objects, obstacles, a status of an object, etc.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "road network map" refers to a graphical representation of one or more roads. This representation may include information pertaining to lanes, lane segments, lane boundaries, traffic lights, yielding relationships, and/or other traffic or road-related information.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for generating a trajectory of an uncertain road user (URU) in proximity of a drivable area that a vehicle will traverse, the method comprising:
 detecting a URU within a threshold distance of a drivable area that a vehicle is traversing or will traverse;

receiving perception information relating to the URU;
for each of a plurality of entry points on a drivable area boundary that the URU can use to enter the drivable area, using a plurality of features associated with that entry point to determine a likelihood that the URU will enter the drivable area from that entry point, the plurality of features computed based on the perception information;
generating, using the plurality of entry points and the corresponding likelihoods, a predicted trajectory of the URU; and
controlling, based on the predicted trajectory, navigation of the vehicle while traversing the drivable area to avoid collision with the URU,
wherein the plurality of features associated with that entry point comprise at least one of the following:
 a distance between the URU's current position and that entry point wherein the likelihood that the URU will enter the drivable area from that entry point increases as the distance decreases,
 time the URU will take to reach that entry point wherein the likelihood that the URU will enter the drivable area from that entry point increases as the time decreases,
 a difference between a tangential vector of the drivable area boundary at that entry point and a heading of the URU wherein the likelihood that the URU will enter the drivable area from that entry point increases as the difference increases,
 a distance between the URU's current position and a lane within the drivable area that is closest to that entry point wherein the likelihood that the URU will enter the drivable area from that entry point increases as the distance decreases, or
 a difference between a direction of the lane and the heading of the URU wherein the likelihood that the URU will enter the drivable area from that entry point increases as the difference increases.

2. The method of claim 1, further comprising identifying each of the plurality of entry points on the drivable area boundary that the URU can use to enter the drivable area by:
 defining a plurality of hypotheses relating to the URU's trajectory for crossing the drivable area boundary; and
 using the perception information and the plurality of hypotheses for identifying the plurality of entry points.

3. The method of claim 2, wherein the plurality of hypotheses comprise at least one of the following:
 the URU will enter the drivable area from an entry point on the drivable area boundary that is closest to the URU's current position;
 the URU will enter the drivable area from an entry point on the drivable area boundary where the drivable area boundary intersects with a heading vector of the URU; or
 the URU will enter the drivable area from an entry point that is determined based on historical information about the drivable area.

4. The method of claim 1, further comprising predicting, using the predicted trajectory, whether the URU will enter the drivable area.

5. A system for generating a trajectory of an uncertain road user (URU) in proximity of a drivable area that a vehicle will traverse, the system comprising:
 a processor and a memory containing programming instructions that are configured to cause the vehicle processor to:
  detect a URU within a threshold distance of a drivable area that a vehicle is traversing or will traverse,
  receive perception information relating to the URU,
  for each of a plurality of entry points on a drivable area boundary that the URU can use to enter the drivable area, use a plurality of features associated with that entry point to determine a likelihood that the URU will enter the drivable area from that entry point, the plurality of features computed based on the perception information,
  generate, using the plurality of entry points and the corresponding likelihoods, a predicted trajectory of the URU, and
  control, based on the predicted trajectory, navigation of the vehicle while traversing the drivable area to avoid collision with the URU,
  wherein the plurality of features associated with that entry point comprise at least one of the following:
   a distance between the URU's current position and that entry point wherein the likelihood that the URU will enter the drivable area from that entry point increases as the distance decreases,
   time the URU will take to reach that entry point wherein the likelihood that the URU will enter the drivable area from that entry point increases as the time decreases,
   a difference between a tangential vector of the drivable area boundary at that entry point and a heading of the URU wherein the likelihood that the URU will enter the drivable area from that entry point increases as the difference increases,
   a distance between the URU's current position and a lane within the drivable area that is closest to that entry point wherein the likelihood that the URU will enter the drivable area from that entry point increases as the distance decreases, or
   a difference between a direction of the lane and the heading of the URU wherein the likelihood that the URU will enter the drivable area from that entry point increases as the difference increases.

6. The system of claim 5, further comprising instructions that cause the processor to identify each of the plurality of entry points on the drivable area boundary that the URU can use to enter the drivable area by:
 defining a plurality of hypotheses relating to the URU's trajectory for crossing the drivable area boundary; and
 using the perception information and the plurality of hypotheses for identifying the plurality of entry points.

7. The system of claim 6, wherein the plurality of hypotheses comprise at least one of the following:
 the URU will enter the drivable area from an entry point on the drivable area boundary that is closest to the URU's current position;
 the URU will enter the drivable area from an entry point on the drivable area boundary where the drivable area boundary intersects with a heading vector of the URU; or
 the URU will enter the drivable area from an entry point that is determined based on historical information about the drivable area.

8. The system of claim 5, further comprising further comprising instructions that cause the processor to predict, using the predicted trajectory, whether the URU will enter the drivable area.

9. A computer program product comprising a non-transitory computer readable medium that contains programming instructions that are configured to cause an autonomous vehicle to:

detect a URU within a threshold distance of a drivable area that a vehicle is traversing or will traverse;

receive perception information relating to the URU;

for each of a plurality of entry points on a drivable area boundary that the URU can use to enter the drivable area, use a plurality of features associated with that entry point to determine a likelihood that the URU will enter the drivable area from that entry point, the plurality of features computed based on the perception information;

generate, using the plurality of entry points and the corresponding likelihoods, a predicted trajectory of the URU; and control, based on the predicted trajectory, navigation of the vehicle while traversing the drivable area to avoid collision with the URU, wherein the plurality of features associated with that entry point comprise at least one of the following:

a distance between the URU's current position and that entry point wherein the likelihood that the URU will enter the drivable area from that entry point increases as the distance decreases, time the URU will take to reach that entry point wherein the likelihood that the URU will enter the drivable area from that entry point increases as the time decreases, a difference between a tangential vector of the drivable area boundary at that entry point and a heading of the URU wherein the likelihood that the URU will enter the drivable area from that entry point increases as the difference increases, a distance between the URU's current position and a lane within the drivable area that is closest to that entry point wherein the likelihood that the URU will enter the drivable area from that entry point increases as the distance decreases, or a difference between a direction of the lane and the heading of the URU wherein the likelihood that the URU will enter the drivable area from that entry point increases as the difference increases.

10. The computer program product of claim 9, further comprising programming instructions that cause the autonomous vehicle to identify each of the plurality of entry points on the drivable area boundary that the URU can use to enter the drivable area by:

defining a plurality of hypotheses relating to the URU's trajectory for crossing the drivable area boundary; and using the perception information and the plurality of hypotheses for identifying the plurality of entry points.

11. The computer program product of claim 10, wherein the plurality of hypotheses comprise at least one of the following:

the URU will enter the drivable area from an entry point on the drivable area boundary that is closest to the URU's current position;

the URU will enter the drivable area from an entry point on the drivable area boundary where the drivable area boundary intersects with a heading vector of the URU; or the URU will enter the drivable area from an entry point that is determined based on historical information about the drivable area.

12. The computer program product of claim 9, further comprising programming instructions that cause the autonomous vehicle to predict, using the predicted trajectory, whether the URU will enter the drivable area.

\* \* \* \* \*